United States Patent [19]

Miller et al.

[11] 4,093,003

[45] June 6, 1978

[54] APPARATUS FOR LOADING AND UNLOADING SHIPS

[75] Inventors: Hermann Miller, Krefeld; Heinz Keltjens, Grevenbroich, both of Germany

[73] Assignee: Mannesmann Aktiengesellschaft, Dusseldorf, Germany

[21] Appl. No.: 681,864

[22] Filed: Apr. 29, 1976

[30] Foreign Application Priority Data

May 15, 1975 Germany ............................ 2522004

[51] Int. Cl.² ................................................ F16L 3/00

[52] U.S. Cl. .................................... 137/615; 141/279; 141/388

[58] Field of Search ................ 137/615; 141/279, 387, 141/388

[56] References Cited

U.S. PATENT DOCUMENTS

| | | | |
|---|---|---|---|
| 3,126,913 | 3/1964 | Green et al. | 137/615 |
| 3,217,748 | 11/1965 | Harper | 137/615 |
| 3,221,772 | 12/1965 | Arntzen | 137/615 |
| 3,340,907 | 9/1967 | Bily | 141/387 |
| 3,451,427 | 6/1969 | Dollinger | 137/615 |
| 3,547,153 | 12/1970 | Bily | 137/615 |
| 3,572,380 | 3/1971 | Jackson et al. | 137/615 |
| 3,707,990 | 1/1973 | Schaible et al. | 137/615 |
| 3,964,512 | 6/1976 | Dumas | 137/615 |

*Primary Examiner*—Irwin C. Cohen

*Attorney, Agent, or Firm*—Cullen, Settle, Sloman & Cantor

[57] ABSTRACT

Apparatus for loading and unloading of ships, including a stand pipe on a dock, an inner jib pipe, a beam approximately parallel to the inner jib pipe, and an outer jib pipe whose free end has a pipe line coupling for connection to the coupling device of a ship. The inner jib pipe at one end is connected to and pivotal in a vertical plane on the stand pipe. The inner jib pipe on its other end supports the outer jib pipe, which is pivotal in the same plane. An extension of the outer jib pipe extending beyond the latter pivot is pivotally connected to one end of the beam. The beam towards its other end is connected pivotally to a link which itself is pivotally connected to the stand pipe. The pivot bearings for the beam and inner jib pipe are arranged coaxially on the stand pipe. The beam and the inner jib pipe are extended beyond the pivot bearing with the stand pipe and carry compensating weights. The improvement which comprises an extension link interposed between said beam and an extension of the outer jib pipe pivotally connected at one end to one end of the beam and at its other end to the outer jib pipe extension. A reciprocal drive mechanism is mounted on said beam and connected to said extension link for modifying the effective length of said beam for translating said outer jib pipe and pipeline coupling to and from a generally vertical rest position.

4 Claims, 3 Drawing Figures

APPARATUS FOR LOADING AND UNLOADING SHIPS

BACKGROUND OF THE INVENTION

The cargo material is guided wholly or partly by the stand pipe, the jib pipes, and where appropriate the link and the beam. Hydraulic cylinders are provided for adjusting the system, these effecting independently of one another the pivoting of the inner jib pipe relatively to the stand pipe and pivoting the outer jib pipe relatively to the inner jib pipe.

Apparatus of this kind is required, for example, for the onloading and offloading of tankers when the size of the tanker prevents offloading by means of flexible tubes. The pivoting system of the apparatus makes is possible to adjust the pipe line coupling of the outer jib pipe to the position of the coupling device provided on the ship, which position varies from ship to ship and also varies during transfer of cargo, and to remove the coupling away from the ship into a basic rest position.

An apparatus is known whose outer jib pipe in fact can also be withdrawn completely behind the vertical line of the dock edge. But this is achieved by pivoting the inner jib pipe beyond the vertical line behind the stand pipe. Now this proposal involves a number of disadvantages. Increasing the pivoting range of the inner jib pipe requires a special bell crank lever on the pivot bearing of the stand pipe, this lever being connected securely to the inner jib pipe. Also, disadvantageous angles result between this bell crank lever and the cylinder axis in the end positions of the apparatus, so that considerable forces have to be applied. The at least partial weight compensation of the pivotable part of the apparatus is also less precise, so that the forces which have to be applied are also increased as a result of this factor. To obviate a considerable tilting moment at right angles to the pivoting axis on the stand pipe, in addition, the inner jib pipe and the beam must be given a fork type of construction and the compensating or balance weight with the adjusting device must be made in two parts, therefore involving more outlay.

SUMMARY OF THE INVENTION

The present invention has as its object to withdraw the outer jib pipe in the basic position completely behind the vertical edge of the dock, so that it does not hinder a berthing ship. The disadvantages of already known apparatus are obviated. The position thus obtained for the apparatus will be referred to hereinafter as the position of rest.

The invention is characterized in that the spacing between the pivot bearings holding the beam can be lengthened.

Lengthening the beam makes it possible to give the outer jib pipe an additional pivoting range without it requiring a special configuration for the purpose. Owing to the relatively light weight of the outer jib pipe only a weak additional drive is required for extending the length of the beam. The lengthening of the beam is possible in various ways, for example, the beam can be constructed partly in the manner of a lazy tongs device or a telescopic arrangement can be used.

Owing to the only slight relative lengthening of the beam it is regarded as advantageous if the beam is capable of being lengthened by an eccentric plate at the outer end. The pivoting axes of the beam and the outer jib pipe are arranged spaced from one another on the eccentric plate. When the eccentric plate is pivoted it acts kinematically as an additional link. Since the eccentric plate is not to be operated in the working range of the apparatus, it will be regarded hereinafter as a part of the beam.

The drive secured on the beam will be a third hydraulic cylinder if the main drives are hydraulic, but the invention also allows the use of other drives, for example, spindle drives, worm drives, etc.

Finally, it is proposed as an advantageous arrangement that the drive of the beam is to be operated only when the inner jib pipe is locked in the erected position (basic position). This last proposal achieves the result that the extensive programmed control which has been found useful with conventional apparatus can be retained completely unaltered. The disturbance to the balance of the apparatus which is caused when the beam is extended in length is insignificant and is readily accepted by the locking means in the position of rest. Thus, the proposals ensure simpler manipulation of the apparatus and reliability.

The invention is explained in detail with reference to the constructional example shown in diagrammatic manner.

THE DRAWINGS

DETAILED DESCRIPTION OF THE INVENTION

Figure 1:
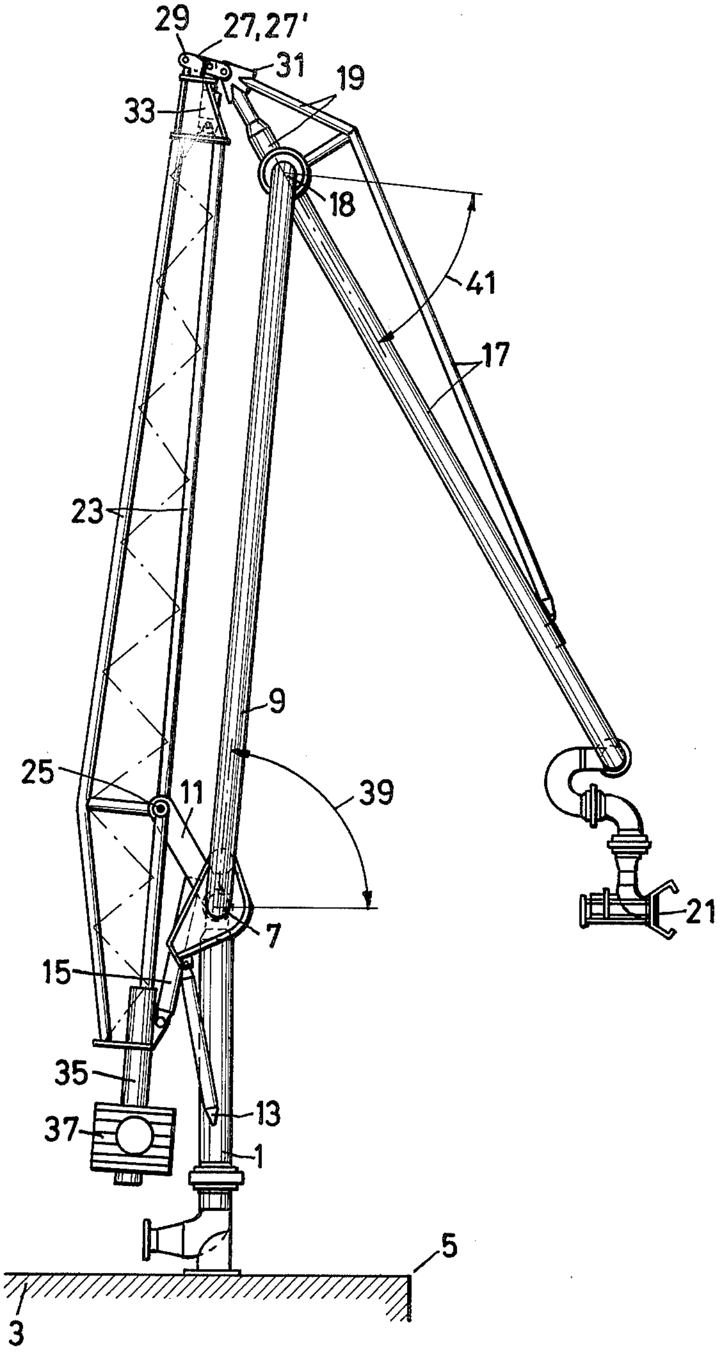
FIG. 1 is a side elevation of the apparatus in the basic use position.

The loading and unloading apparatus is securely mounted upon the stand pipe 1 on the dock 3 at a safety interval from the dock edge 5. On the upper end of the stand pipe the inner jib pipe 9 and a link 11 are pivotally mounted at 7 in a coaxial double bearing. The pivoting movement of the members 9 and 11 is effected by the cylinders 13 and 15 which are operated independently of one another. On the other end of the inner jib pipe 9 is pivotally mounted the outer jib pipe 17, 19 having a pipe line coupling 21 at the ship coupling device side, including pivot bearing 18. The beam 23 is connected adjacent one end at the pivot bearing 25 to the link 11, and at its other end by the eccentric plate 27, 27' to the pivot bearings 29, 31 to the extension 19 of the outer jib pipe 17. The eccentric plate 27 is pivotal about the bearing 29 by means of the hydraulic cylinder 33. The beam 23 includes a counter-weight 37 on its extension 35.

Figure 2:
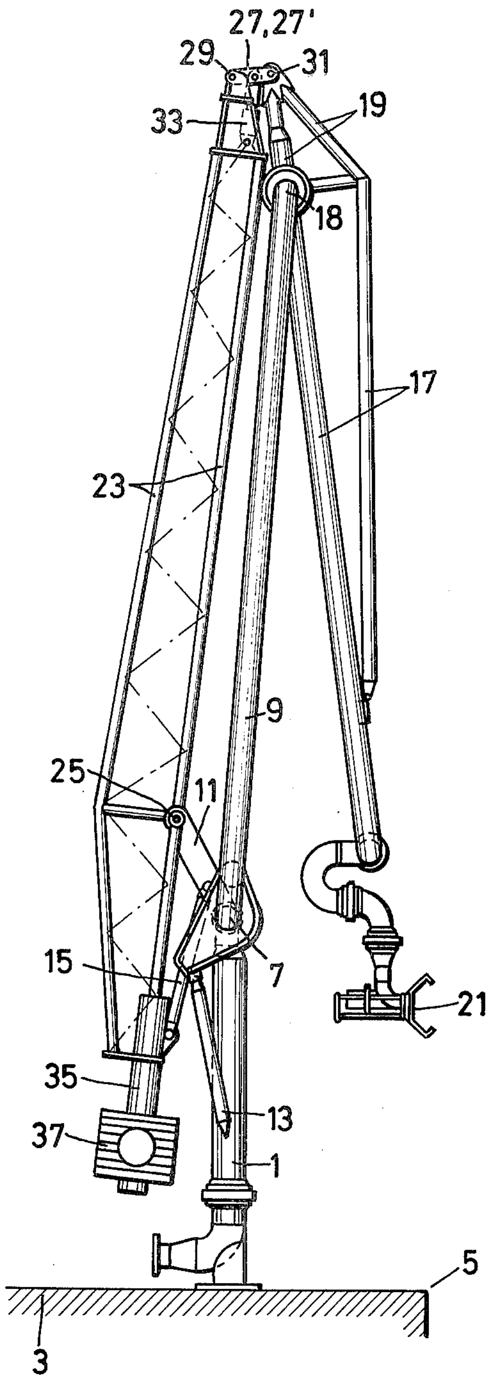
FIG. 2 is a similar view of the apparatus in the generally vertical position of rest.
Figure 3:
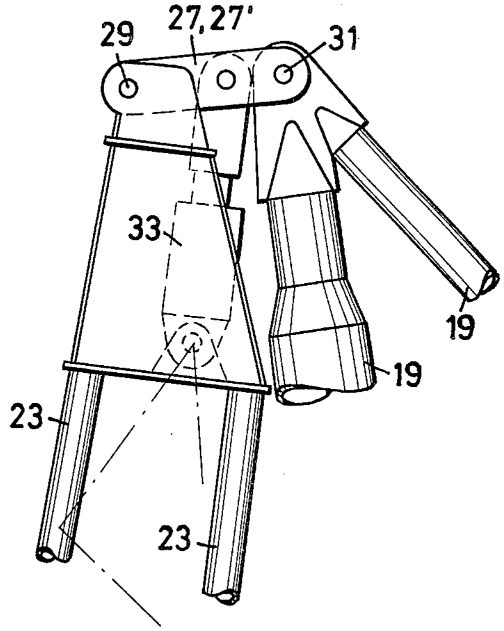
FIG. 3 is a similar fragmentary view on a larger scale of the junction of the outer jib pipe with the beam in the generally vertical position of rest.

The working range of the apparatus is determined by the pivoting range 39 of FIG. 1 of the inner jib pipe 9 and the pivoting range 41 of the outer jib pipe 17. From the basic position in FIG. 1 the apparatus is pivoted into the desired working position by actuating the cylinders 13 and 15. The pivot bearing 29 of the eccentric plate 27 is locked. When the cylinders 13 and 15 are locked the apparatus can be brought from the basic position shown in FIG. 1 into the generally vertical position of rest shown in FIG. 2 by actuating the cylinder 33, the eccentric plate 27 then taking up the position shown in FIG. 3. The outer jib pipe 17 is thereby withdrawn behind the dock edge 5.

The extension of the beam 23 in the constructional example is effected in such a way that the eccentric plate 27 is regarded as a part of the beam. Kinematically, the eccentric plate 27 can also be regarded as an additional link 27' which is mounted to be pivotal at both ends and connects the beam 23 with the outer jib pipe extension 19.

Having described our invention, reference should now be had to the following claims:

1. In apparatus for loading and unloading ships, a stand pipe on a dock, an inner jib pipe, bearing means at one end of the inner jib pipe connecting and pivotally mounting the inner jib pipe upon said stand pipe for movement in a vertical plane, an outer jib pipe, bearing means connecting and pivotally mounting one end of said outer jib pipe upon the other end of said inner jib pipe for pivotal movement in the same plane, an extension on said outer jib pipe extending rearward of said latter pivotal connection, a beam extending approximately parallel to the inner jib pipe, the beam adjacent one end pivotally connected through a link to said stand pipe at a bearing coaxial with the pivot bearing means of said inner jib pipe, and counter-weights on said beam for providing weight compensation for the mobile parts of the pivot bearing means on the stand pipe, hydraulic cylinders respectively connected for independent adjustment of the jib pipes; the improvement for position both said inner and outer jib pipes in a generally vertical rest position behind the dock edge comprising linkage means between said beam and the rearward extension of said outer jib pipe at its ends pivotally connected thereto respectively, and movable power means on said beam connected to said linkage means whereby the length of the beam between the pivot bearings (25) and the link (11) and the pivot bearings (31) with the extension 19 of the outer jib pipe (17) may be extended, for retracting said outer jib pipe to said rest position.

2. Apparatus according to claim 1, characterized in that said linkage means comprises an extension piece (27), the position of which can be varied and which supports the pivot bearing (31).

3. Apparatus according to claim 2, characterized in that the extension piece (27) is constructed as an eccentric plate or as a link whose position can be modified by said power means, said power means including a drive (33) secured on said beam.

4. Apparatus according to claim 3, characterized in that said drive is a hydraulic drive.

* * * * *